(12) United States Patent
van Willingen et al.

(10) Patent No.: US 9,121,739 B2
(45) Date of Patent: Sep. 1, 2015

(54) MAGNETIC-INDUCTIVE FLOWMETER

(71) Applicant: Krohne AG, Basel (CH)

(72) Inventors: Arnoud van Willingen, Capelle (NL); J. C. González Pelayo, Meteren (NL); Chistian Paul, Rotterdam (NL)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 13/946,164

(22) Filed: Jul. 19, 2013

(65) Prior Publication Data

US 2014/0020477 A1    Jan. 23, 2014

(30) Foreign Application Priority Data

Jul. 19, 2012 (DE) .......................... 10 2012 014 266

(51) Int. Cl.
 *G01F 1/58* (2006.01)
(52) U.S. Cl.
 CPC ...................................... *G01F 1/588* (2013.01)
(58) Field of Classification Search
 CPC .................................. G01F 1/58; F16B 31/02
 USPC .......................................... 73/861.12, 761.17
 See application file for complete search history.

(56) References Cited

U.S. PATENT DOCUMENTS

| | | | | | |
|---|---|---|---|---|---|
| 4,409,846 | A | * | 10/1983 | Ueno | 73/861.17 |
| 4,414,856 | A | * | 11/1983 | Winterhoff | 73/862.333 |
| 4,470,309 | A | * | 9/1984 | Wada | 73/861.12 |
| 4,614,121 | A | * | 9/1986 | Hansen et al. | 73/861.12 |
| 4,795,267 | A | * | 1/1989 | Amata | 374/41 |
| 4,932,268 | A | * | 6/1990 | Hafner | 73/861.12 |
| 6,802,223 | B2 | * | 10/2004 | Nakatani et al. | 73/861.12 |
| 7,992,451 | B2 | * | 8/2011 | Ehrenberg et al. | 73/861.12 |
| 2004/0123670 | A1 | * | 7/2004 | Nakatani et al. | 73/861.12 |
| 2009/0260453 | A1 | * | 10/2009 | Kawakami et al. | 73/861.12 |
| 2014/0053658 | A1 | * | 2/2014 | Neven | 73/861.12 |

FOREIGN PATENT DOCUMENTS

DE    10 2006 060 442 A1    6/2008

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

A magnetic-inductive flowmeter with a measuring tube having a measuring section, a magnetic field generating apparatus for generating a magnetic field in the measuring section of the measuring tube, and two electrodes which are located in the measuring section of the measuring tube for detecting the measurement voltage, the magnetic field generating apparatus having magnet coils which are located outside of the measuring section of the measuring tube and have a respective coil core. The cores of the magnet coils with reference to the magnetic flux make contact with two yoke elements via magnetic connection elements in a magnetically highly conductive manner and the yoke elements partially border the measuring section of the measuring tube.

10 Claims, 4 Drawing Sheets

MAGNETIC-INDUCTIVE FLOWMETER

BACKGROUND OF THE INVENTION

1. Field of the Invention

The invention relates to a magnetic-inductive flowmeter with at least one measuring tube, the measuring tube having at least one measuring section, with at least one magnetic field generating apparatus for generating a magnetic field in the measuring section of the measuring tube, and with at least two electrodes which are located in the measuring section of the measuring tube for detecting the measurement voltage, the magnetic field generating apparatus having at least one magnet coil which is located preferably outside the measuring section of the measuring tube with a coil core.

2. Description of Related Art

For flow rate measurement with a magnetic-inductive flowmeter a measuring tube is used which is preferably composed of a nonmagnetic material, for example, of plastic or a nonmagnetic metal which is electrically insulated from the measurement fluid in the region of the measuring section of the measurement medium or the measurement fluid, for example, a liquid, a gas or a mixture of a liquid and solids located in it. According to the prior art, in operation, a magnetic field which has been generated by a magnetic field generating apparatus permeates the measuring tube in the measuring section at least in part essentially perpendicular to the flow direction of the measurement medium. If the measurement medium has a minimum electrical conductivity, during flow of the medium its charge carriers are deflected by the magnetic field. On electrodes which are located perpendicular to the magnetic field and to the flow direction and which are coupled either conductively or capacitively to the measurement medium, charge separation causes an electrical potential difference which is detected with a measurement device and is evaluated as a measurement voltage. Since the measurement voltage which can be tapped is proportional to the flow velocity of the charge carriers which are moved with the measurement medium, the flow velocity can be deduced from the measurement voltage which can be tapped and the flow rate in the measuring tube can then be deduced from the flow velocity.

The magnetic field generating apparatus in the prior art generally is comprised of at least one magnet coil with a coil core and of two pole shoes which are facing one another and of which at least one is connected in a magnetically conductive manner to the magnet coil or the core of the magnet coil. Energizing the magnet coil or the magnet coils generally produces an alternating magnetic field in the measuring section of the measuring tube.

The level of the measurement voltage which can be tapped on the electrodes is especially dependent on the strength of the acting magnetic field. Therefore, in the prior art, measures are taken to increase the strength of the acting magnetic field, but also to enhance the homogeneity of the acting magnetic field.

The magnetic-inductive flowmeter on which the invention is based is known from a German patent application, specifically from German Patent Application DE 10 2006 060 442 A1. In this known magnetic-inductive flowmeter, the magnetic field generating apparatus is made in two parts; specifically, two modules which can be plugged into one another and which each have one magnet coil. The modules are attached to the outside wall of the measuring tube by clamping for purposes of measurement, and the measuring tube has a flattened shape in the measuring section which is encompassed by the modules. The entire magnetic field generating apparatus is therefore located outside the measuring tube in the known magnetic-inductive flowmeter on which the invention is based.

For the configuration of magnetic-inductive flowmeters generally two different conditions must be met or there is an effort to achieve the corresponding optimization. On the one hand, it is desired to achieve an increase of the measurement accuracy, for which reason the aforementioned procedure for increasing the magnetic field strength or also the optimization of the shape of the magnetic field within the measuring section are used. On the other hand, the outer dimensioning of the flowmeter is to be held to a minimum since flowmeters are used in process systems in which often a shortage of space prevails making it advantageous for the flowmeter itself to be as small or compact as possible.

SUMMARY OF THE INVENTION

A primary object of the present invention is to devise a magnetic-inductive flowmeter in which the measurement accuracy is mechanically supported and which is characterized by an installation space as small as possible.

The magnetic-inductive flowmeter in accordance with the invention in which the aforementioned object is achieved is, first of all, essentially characterized in that the core of the magnet coil or the cores of the magnet coils with reference to the magnetic flux make contact with at least two yoke elements or the cores of the magnet coils make contact with at least one respective yoke element and that the yoke elements at least partially border the measuring section of the measuring tube. "Bordering the measuring section of the measuring tube" can mean especially that the measuring section of the measuring tube is formed at least partially by the yoke elements which are connected in a magnetically conductive manner to the core of the magnet coil or the cores of the magnet coils.

While in the magnetic-inductive flowmeter which is disclosed by DE 10 2006 060 442 A1 and on which the invention is based, the entire magnetic field generating apparatus is implemented outside the measuring tube and specifically outside the measuring section of the measuring tube, in the magnetic-inductive flowmeter in accordance with the invention, the yoke elements which have made contact with the core of the magnet coil or the yoke elements which have made contact with the cores of the magnet coils with reference to the magnetic flux form at least in part the measuring section of the measuring tube.

What is meant by "measuring tube" and "measuring section with measuring tube" within the scope of the invention requires explanation is as follows. "Measuring tube" means the component of the magnetic-inductive flowmeter under consideration through which the measurement fluid flows from a measuring tube inlet to a measuring tube outlet, whose flow rate is to be measured. The "measuring section of the measuring tube" is a section of the measuring tube which viewed in the flow direction of the flowing measurement fluid is downstream of the measuring tube inlet and upstream of the measuring tube outlet and in which the flow rate is measured, i.e., the generated magnetic field acts on the flowing measurement fluid and in this way in the flowing measurement fluid charge separation takes place and causes an electrical potential difference which can be tapped as a measurement voltage and evaluated.

The "measuring section of the measuring tube" can be quite simply a section of the measuring tube, as explained as above in terms of space and function. The "measuring section of the measuring tube" can however also be a section of the measuring tube which has been specially configured in geometrical-spatial terms. In particular, the "measuring section of the measuring tube" can be formed by the measuring tube being flattened on both sides in the region of the measuring section; the "measuring section of the measuring tube" can therefore be a rectangle or a rectangle with rounded corners.

Often, in magnetic-inductive flowmeters, the magnet coils are not located in the vicinity or in the region of the electrodes, but offset by 90° relative to the electrodes. In the magnetic-inductive flowmeter in accordance with the invention, however, it is recommended that the magnet coils be located in the vicinity of the electrodes.

As stated above, in the magnetic-inductive flowmeter in accordance with the invention the measuring section of the measuring tube, therefore the "inner" measuring tube, can have an essentially rectangular cross section, therefore two longitudinal sides and two narrow sides or transverse sides.

In the embodiment of a magnetic-inductive flowmeter in accordance with the invention which was described last, the magnet coil or magnet coils can be located within the measuring tube, specifically inside the "outer" measuring tube, but of course outside the "inner" measuring tube. Likewise, it is recommended that the magnet coil or the magnet coils be located outside the measuring tube, and specifically outside the "outer" measuring tube because then the initial mounting, and for example, repair-induced dismounting can be carried out especially easily.

As already stated, generally, a magnetic-inductive flowmeter of a certain size also requires a magnetic field with a certain field strength. The field strength arises, on the one hand, from the size of the magnet coil or magnet coils, and on the other hand, from the energization. With consideration of the fact that a small installation space is desired, it can be recommended that the magnetic field generating apparatus be provided with a total of four magnet coils.

One especially preferred embodiment of a magnetic-inductive flowmeter in accordance with the invention is described below. This special embodiment is first of all essentially characterized, in addition to the measures described so far, in that between the core of the magnet coil or between each core of each magnet coil there is one magnetic connection element at a time. Then it is recommended that the measuring tube be provided with a recess or with recesses and the magnetic connection element or magnetic connection elements be routed through the recess or through the recesses.

What can be achieved with the measures described last and what advantages the implementation of these measures entails and to what extent in the magnetic-inductive flowmeter in accordance with the invention other measures can be advantageously implemented, will be explained. In particular, there is specifically a plurality of possibilities for embodying and developing the magnetic-inductive flowmeter in accordance with the invention as will become apparent from the following detailed description of preferred exemplary embodiments in conjunction with the accompanying drawings.

DETAILED DESCRIPTION OF THE INVENTION

Figure 1:
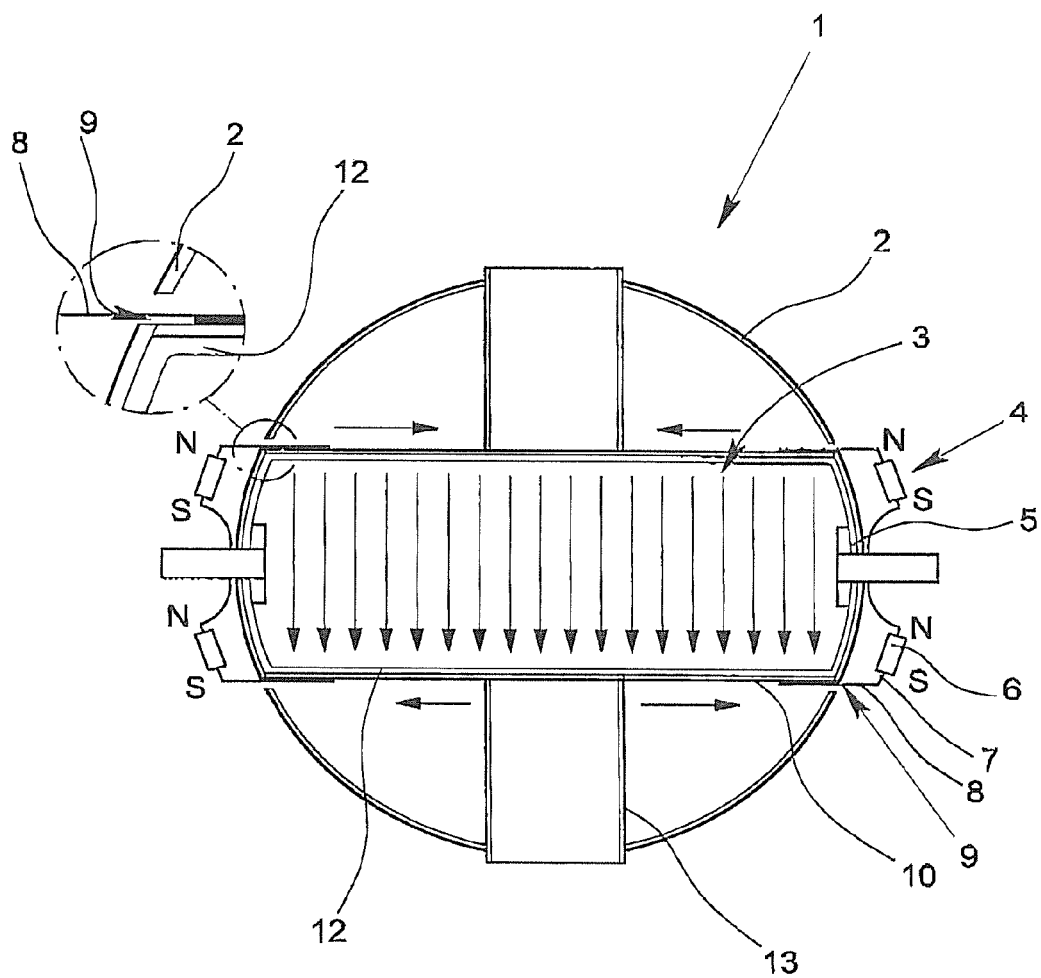
FIG. 1 is a schematic sectional view through a magnetic-inductive flowmeter with an enlarged detail broken out.

FIG. 1 shows a section through a magnetic-inductive flowmeter 1 having a cylindrical measuring tube 2 with a circular cross section. A measuring section 3 of the measuring tube 2, viewed in the flow direction of the measurement fluid, in the middle region of the measuring tube 2, in the illustrated exemplary embodiment, has an essentially rectangular cross section, the short sides being arc-shaped instead straight due to their being formed by part of the measuring tube 2 that has a circular cross section,.

In the illustrated exemplary embodiment, the measuring tube 2 should be viewed, on the one hand, geometrically-spatially, and on the other hand, functionally. Viewed geometrically-spatially, the measuring tube 2, beginning with the measuring tube inlet and ending with the measuring tube outlet, continuously has a circular cross section. However, viewed functionally, the measuring tube 2 has a cross sectional constriction which can be implemented in the measuring section 3. This cross sectional constriction leads to an increase in the velocity of the flowing measurement fluid, and thus, to an increase of the measurement voltage under otherwise identical conditions.

As dictated by operation, the magnetic-inductive flowmeter (which is shown only schematically in the figures) includes a magnetic field generating apparatus 4 which generates a periodically changing magnetic field. On the short sides of the essentially rectangular measuring section 3 of the measuring tube 2, two electrodes 5 are attached which are in direct contact with the measurement fluid (not shown), and the electrodes are used to tap an induced voltage.

The magnetic field generating apparatus 4 has four magnet coils 6 whose coil cores 7 which are formed together with magnetic connection elements 8; the coil cores 7 and magnetic connection elements 8, in this exemplary embodiment, are thus components of the magnetic field generating apparatus 4 which, on the one hand, implement the coil cores 7 within the magnet coils 6, and on the other, implement the magnetic connection elements 8. Here, both the coil cores 7 and also the magnetic connection elements 8 or in the illustrated exemplary embodiment the components which implement the coil cores 7 and the magnetic connection elements 8 have high magnetic permeability. However, embodiments are also possible in which the coil cores 7, on the one hand, and the first yoke elements, on the other, are first of all separate components which are then connected to one another, and specifically are connected to one another such that they act functionally like one component, especially therefore altogether a high magnetic permeability is implemented. In the separate execution of the coil cores 7 and of the magnetic connection elements 8, therefore, the coil cores 7 and the magnetic connection elements 8 must be connected to one another such that a magnetic resistance that is as small as possible exists between them.

The measuring tube 2, which is also made geometrically-spatially continuously cylindrical with a circular cross section in the region of the measuring section 3, has four recesses 9 through which, as FIG. 1 shows, the magnetic connection elements 8 project into the interior of the "outer" measuring tube 2.

As stated, the measuring tube 2 also in the region of the measuring section 3 is made, first of all, geometrically-spatially in exactly the same manner as outside of the measuring section 3. Otherwise, however, the measuring tube 2 in the region of the measuring section 3 is executed functionally, as described above, specifically with a cross sectional narrowing such that the measuring tube 2 in the region of the measuring section 3 also has a part with a rectangular cross section. In the region of the measuring section 3, therefore, there essentially are a cylindrical "outer" measuring tube 2, with a circular cross section, and an "inner" measuring tube 2 with a rectangular cross section, in the region of the "inner" measuring tube 2, the measuring section 3 being implemented.

Figure 2:
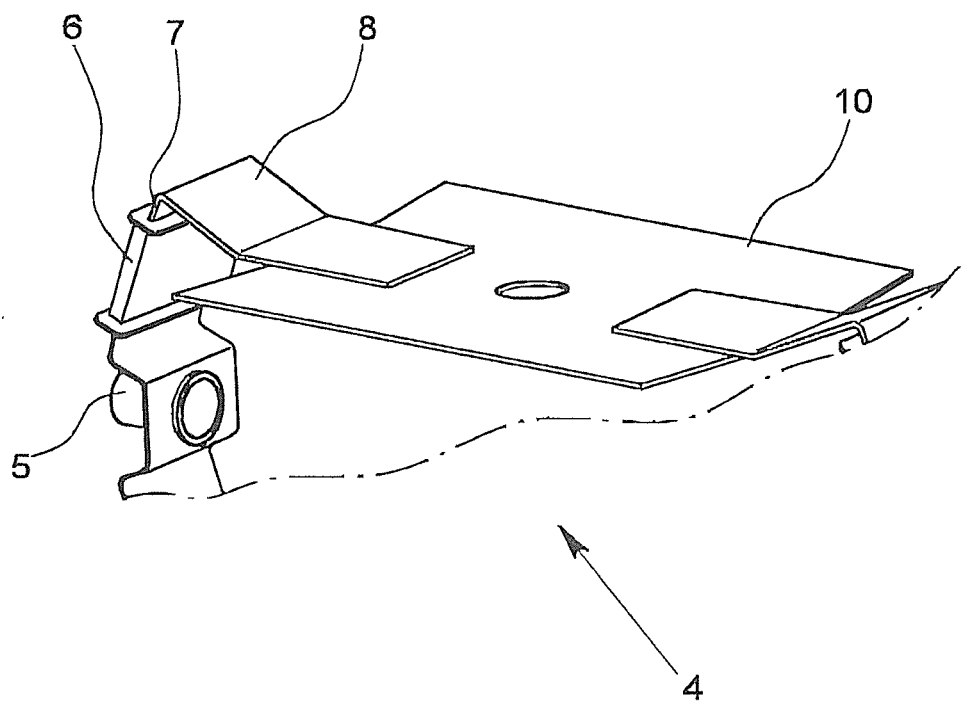
FIG. 2 is a perspective view of a detail of a magnetic field generating apparatus which belongs to a magnetic-inductive flowmeter in accordance with the invention.
Figure 3:
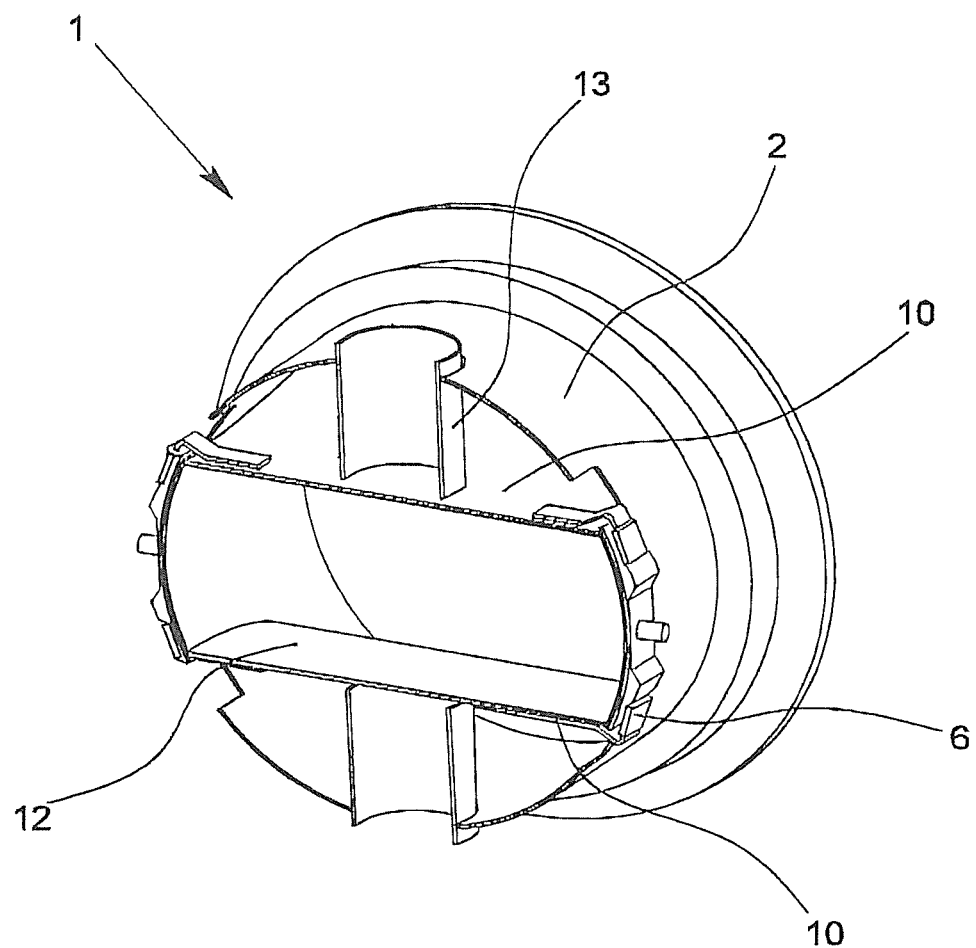
FIG. 3 is a perspective view of a part of a magnetic-inductive flowmeter in accordance with the invention.

As FIGS. 1 and 2 in particular show, basically, also FIG. 3, the cores 7 of the magnet coils 6 are connected to yoke elements 10 with reference to the magnetic flux, specifically to yoke elements 10 which, like the coil cores 7, have a high magnetic permeability. In the illustrated exemplary embodiment, first of all, since magnetic connection elements 8 adjoin the cores 7 of the magnet coils 6, the yoke elements 10 are "magnetically" connected to the magnetic connection elements 8, i.e., in the transition between the magnetic connection elements and the yoke elements, in turn, a magnetic resistance that is as small as possible is implemented.

As shown in FIGS. 1 and 3, the yoke elements 10 border the measuring section 3 of the measuring tube 2. The bordering of the measuring section 3 of the measuring tube 2 can mean that the measuring section 3 of the measuring tube 2 is formed in part by the yoke elements 10 which are connected in a magnetically conductive manner via the magnetic connection elements 8 to the cores 7 of the magnet coils. Therefore, in this embodiment, the yoke elements 10 are part of the "inner" measuring tube 2 which is implemented in the region of the measuring section 3. However, in the illustrated embodiment, the "inner" measuring tube 2 is continuously present, therefore, it is not formed in part by the yoke elements 10; this can be implemented quite advantageously. In the region of the longitudinal sides of the "inner" measuring tube 2 the "inner" measuring tube 2 forms carrier elements 11 for the yoke elements 10.

In the illustrated exemplary embodiment of a magnetic-inductive flowmeter in accordance with the invention, the measuring tube 2, specifically both the "outer" measuring tube 2 and also the "inner" measuring tube 2 (in the region of the measuring section 3), is provided with an inner lining 12 which provides protection against the measurement fluid, which can be corrosive or abrasive.

The enlarged detail in FIG. 1 clearly indicates that, in the exemplary embodiment, the measuring tube 2 is provided with recesses 9, of which only one opening 9 can be seen, that the magnetic connection element 8 projects through the opening 9, the magnetic connection element 8 being either connected to the core 7 of a magnet coil 6 in a magnetically well conductive manner or the magnetic connection element 8 and the coil core 7 are a component with high magnetic permeability. The yoke element 10 is connected to the magnetic connection element 8 in a magnetically highly conductive manner and rests on the "inner" measuring tube 2 in the region of the measuring section 3, the "inner" measuring tube 2 made there as a carrier unit 11.

In the exemplary embodiment, but not necessarily to implement it in this way, the magnet coils 6 are located outside the measuring tube 2, both outside the "inner" measuring tube 2 and also outside the "outer" measuring tube 2. The magnetic field which is necessary for a magnetic-inductive flowmeter can be adjusted or controlled by energizing the magnet coils 6. Energization is dependent on how many and what types of magnet coils 6 are provided and what strength the magnetic field in the measuring section 3 is to have.

As FIG. 1 shows, in the magnetic-inductive flowmeter under consideration, there are four magnet coils; on each narrow side of the measuring section 3 there are two magnet coils 6, specifically outside the "inner" measuring tube 2 and also outside the "outer" measuring tube 2. However, it is also possible to provide the magnet coils 6 outside the "inner" measuring tube 2, but inside the "outer" measuring tube 2, because the measurement fluid does not flow in the space between the "outer" measuring tube 2 and the "inner" measuring tube 2, but rather flows rather in the region of the measuring section 3 only within the "inner" measuring tube 2. The arrangement of the magnet coils 6 outside the "outer" measuring tube 2 however has the advantage of especially simple mounting and of especially simple replacement if this should be necessary.

FIG. 2 shows in detail one part of the magnetic field generating apparatus 4 which belongs to the magnetic-inductive flowmeter 1 in accordance with the invention. A magnet coil 6, its coil core 7, the magnetic connection element 8 which adjoins the coil core 7, connected integrally to the coil core 7, and the yoke element 10 are easily apparent.

Otherwise, it applies to the illustrated exemplary embodiment of a magnetic-inductive flowmeter in accordance with the invention that two electrodes 5 are provided respectively on each of the narrow sides of the "inner" measuring tube 2 and on the narrow sides of the measuring section 3.

It is not shown in particular that the coil cores 7, the magnetic connection elements 8 or/and the yoke elements 10 can be made coated to keep eddy currents as small as possible or to avoid them; the individual layers are of course being electrically insulated from one another.

Figure 4:
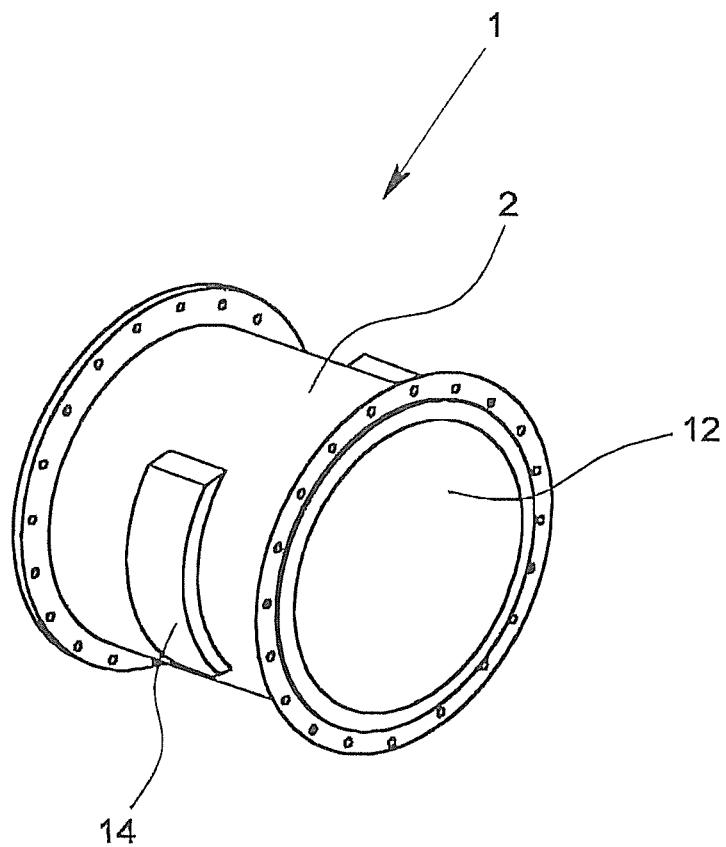
FIG. 4 is a perspective view that very schematically shows a magnetic-inductive flowmeter.

It further applies to the illustrated exemplary embodiment of a magnetic-inductive flowmeter 1 in accordance with the invention that, on each longitudinal side of the measuring section 3, between the "outer" measuring tube 2 and the "inner" measuring tube 2, there is a support element 13, and that, as shown in FIG. 4, in the region of the electrodes 5 and the magnet coils 6, there is a cover element 14 which is placed from the outside on the measuring tube 2.

It applies to the illustrated exemplary embodiment of a magnetic-inductive flowmeter 1 in accordance with the invention that on each longitudinal side of the "inner" measuring tube 2, therefore on each longitudinal side of the measuring section 3 which is made essentially with a rectangular cross section, there is only one yoke element 10 which on its two narrow sides is connected in a magnetically highly conductive manner to a respective magnetic connection element 8. Here then, the magnetic field generating apparatus 4 works only when the magnet coils 6, which are magnetically connected to the yoke element 10 via the coil cores 7 and the magnetic connection elements 8, generate rectified magnetic fields. In the figure, the north poles of the individual magnet coils are labeled "N" and the south poles are labeled "S".

An embodiment of magnetic-inductive flowmeters 1 with only one yoke element 10 on each longitudinal side of the measuring section 3 of the measuring section 3 is easily possible, however there can also be two yoke elements 10 on each longitudinal side of the measuring section 3. Here then, the two yoke elements 10 which are provided on each side of the measuring section 3 are separated by a gap.

It can be taken from FIG. 2 that, in the exemplary embodiment, the magnet coils 6 and especially their turns are made flat in order to keep the space which is occupied by the magnet coils 6 as small as possible.

As can be taken in turn especially from FIG. 2, the yoke elements 10 are made much wider than the magnetic connection elements 8 and the coil cores 7. This "lengthens" the functionally necessary magnetic field in the flow direction of the measurement fluid.

What is claimed is:

1. A magnetic-inductive flowmeter, comprising:
   at least one measuring tube, the measuring tube having at least one measuring section,
   at least one magnetic field generating apparatus for generating a magnetic field in the measuring section of the measuring tube, and having at least one magnet coil with a coil core, and
   at least two electrodes which are located in the measuring section of the measuring tube for detecting measurement voltage,
   wherein the core of the at least one magnet coil, with reference to the magnetic flux, makes contact with at least two yoke elements and
   wherein the at least yoke elements at least partially border the measuring section of the measuring tube,
   wherein the measuring tube has an outer tube and an inner measuring tube between which there is at least one support element.

2. The magnetic-inductive flowmeter in accordance with claim 1, wherein the at least one magnet coil is located in the vicinity of the electrodes.

3. The magnetic-inductive flowmeter in accordance with claim 1, wherein the measuring section of the measuring tube has an essentially rectangular cross section with two longitudinal sides and two narrow sides.

4. The magnetic-inductive flowmeter in accordance with claim 1, wherein the at least one magnet coil is located outside the measuring tube.

5. The magnetic-inductive flowmeter in accordance claim 1, wherein the magnetic field generation apparatus has four magnet coils.

6. The magnetic-inductive flowmeter in accordance with claim 1, wherein there is a respective magnetic connection element between each yoke and the core of the at least one magnet coil.

7. The magnetic-inductive flowmeter in accordance with claim 6, wherein each magnetic connection element is routed through a respective opening in the measuring tube.

8. The magnetic-inductive flowmeter in accordance with claim 3, wherein the at least two yoke elements comprise four yoke elements of which two yoke elements are located on each longitudinal side of the measuring section of the measuring tube, and wherein between the yoke elements on each longitudinal side of the measuring section of the measuring tube are separated from each other by a magnetic gap.

9. The magnetic-inductive flowmeter in accordance with claim 1, wherein the measuring tube has an inner lining.

10. The magnetic-inductive flowmeter in accordance with claim 1, wherein there is a cover element on the outside of the measuring tube for covering the electrodes, the magnet coils, the coil cores, and partially the magnetic connection elements.

* * * * *